358-190. OR 3,828,123 SR

Bldg. 4
1017

United States Patent [19]

Sato

[11] 3,828,123

[45] Aug. 6, 1974

[54] REGULATED H.V. POWER ENERGY FOR A TELEVISION RECEIVER

[75] Inventor: Kohei Sato, Ikeda, Japan

[73] Assignee: Matsushita Electric Industrial Co., Ltd., Osaka, Japan

[22] Filed: Jan. 31, 1972

[21] Appl. No.: 222,192

[30] Foreign Application Priority Data

Feb. 4, 1971 Japan .................................. 46-4396

[52] U.S. Cl.... 178/7.3 R, 178/DIG. 11, 323/DIG. 1

[51] Int. Cl. .......................... H04n 3/18, H04n 5/44

[58] Field of Search ........ 178/7.3 R, 7.3 DC, 7.5 R, 178/7.5 DC, DIG. 11; 315/27 R, 27 TD; 323/DIG. 1

[56] References Cited

UNITED STATES PATENTS 3,217,101 11/1965 Mattingly ......................... 178/7.3 R

FOREIGN PATENTS OR APPLICATIONS 1,227,765 4/1971 Great Britain ............... 178/DIG. 11
1,529,787 5/1968 France ......................... 178/DIG. 11
2,041,228 2/1971 Germany ..................... 178/DIG. 11

*Primary Examiner*—Robert L. Richardson
*Attorney, Agent, or Firm*—Stevens, Davis, Miller & Mosher

[57] ABSTRACT

A television receiver in which a d.c. voltage applied from a controlled power source to a flyback transformer is controlled by a feedback circuit which feeds back a signal responsive to a drift of the high-tension output of the flyback transformer to the controlled power source so as to continuously maintain the high-tension output of the flyback transformer at a predetermined setting.

9 Claims, 5 Drawing Figures

T5117
Rm

PATENTED AUG 6 1974 3,828,123

SHEET 3 OF 5

REGULATED H.V. POWER ENERGY FOR A TELEVISION RECEIVER

This invention relates to television receivers and more particularly to means for stabilizing the high-tension output of a flyback transformer in a television receiver.

In a television receiver in which a constant deflection field is utilized for deflecting an electron beam, the deflection angle of the electron beam is generally dependent upon the velocity of the electron beam, and the velocity of the electron beam is generally dependent upon the high-tension output of a flyback transformer applied to a cathode-ray tube, the high-tension output of the flyback transformer being variable depending on variations in the beam current, hence variations in the brightness of the picture. Thus, any variations in the brightness of the picture result in corresponding variations in the deflection angle of the electron beam thereby giving rise to undesirable expansion and contraction of the televised picture. In order to prevent this undesirable expansion and contraction of the picture, therefore, it is necessary to maintain the high-tension output of the flyback transformer at a constant value.

In an arrangement which has been proposed heretofore in an effort to stabilize the high-tension output of the flyback transformer, a high-tension stabilizing tube is connected in parallel with the cathode-ray tube as another load of the flyback transformer and is supplied with more or less current depending on the current supplied to the cathode-ray tube so that the high-tension output of the flyback transformer can be maintained always constant. However, the television receiver having such an arrangement has been defective in that the high-tension output of the flyback transformer may become excessively large in the event of failure of the high-tension stabilizing tube due to heater disconnection, reduction in emission or any other trouble and in that power is wastefully consumed by the high-tension stabilizing tube.

Another arrangement has been proposed heretofore according to which, means such as a reactor is connected in parallel with the flyback transformer for varying the internal impedance of the flyback transformer thereby stabilizing the high-tension output of the flyback transformer. This proposal, however, has not been successful in satisfactorily stabilizing the high-tension output of the flyback transformer due to the fact that the internal impedance of the flyback transformer can only be reduced to a level in the order of 2 to 3 megohms.

The present invention eliminates the defects encountered with the prior art arrangements and has for its primary object to provide a television receiver, which comprises a cathode-ray tube, with a flyback transformer delivering a high-tension d.c. output for applying same to the cathode-ray tube, means including a horizontal output circuit connected to the flyback transformer, a controlled power source for applying a d.c. control input to the flyback transformer for controlling the latter, and high-tension drift detecting means connected between the flyback transformer and said controlled power source for detecting any drift of the high-tension d.c. output of the flyback transformer due to a variation in the load current and applying a detected drift signal variable depending on the drift to the controlled power source to control the control input applied to the flyback transformer thereby stabilizing the high-tension d.c. output of the flyback transformer.

According to the present invention, the internal impedance of the flyback transformer can be reduced to less than 1 megohm. Thus, the high-tension output of the flyback transformer can be sufficiently stabilized thereby preventing undesirable expansion and contraction of the picture reproduced on the cathode-ray tube, and undesirable application of an excessively high tension to the cathode-ray tube can be avoided even with a small beam current. Further, an automatic brightness control can be easily incorporated in the television receiver by merely adding a few circuit elements.

The above and other objects, features and advantages of the present invention will be apparent from the following description taken in conjunction with the accompanying drawing, in which.

Figure 1:
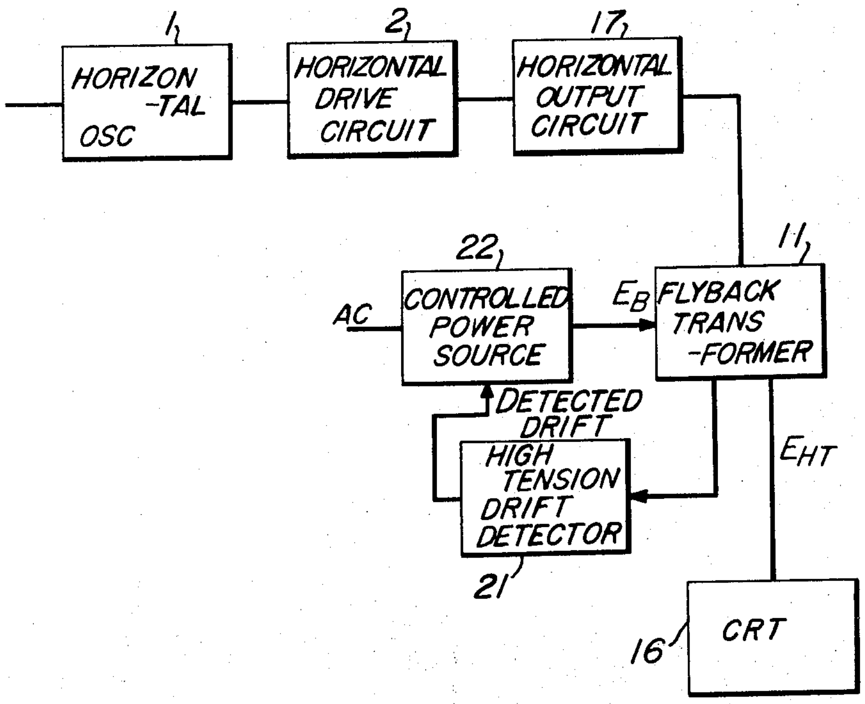
FIG. 1 is a block diagram of an embodiment of the present invention.

An embodiment of the present invention will now be described with reference to FIG. 1. A horizontal oscillator 1 applies its output to a horizontal drive circuit 2 which drives a horizontal output circuit 17. A flyback transformer 11 is driven by the horizontal output circuit 17 and applies its high-tension d.c. output $E_{HT}$ to a cathode-ray tube 16. The high-tension output $E_{HT}$ of the flyback transformer 11 is dependent upon a d.c. voltage $E_B$ applied from a controlled power source 22. Therefore, the high-tension output $E_{HT}$ of the flyback transformer 11 can be stabilized by detecting any drift of the high-tension output $E_{HT}$ by a high-tension drift detector 21 and controlling the operation of the controlled power source 22 by the detected drift signal delivered from the high-tension drift detector 21 thereby controlling the input $E_B$ applied to the flyback transformer 11.

Figure 2:
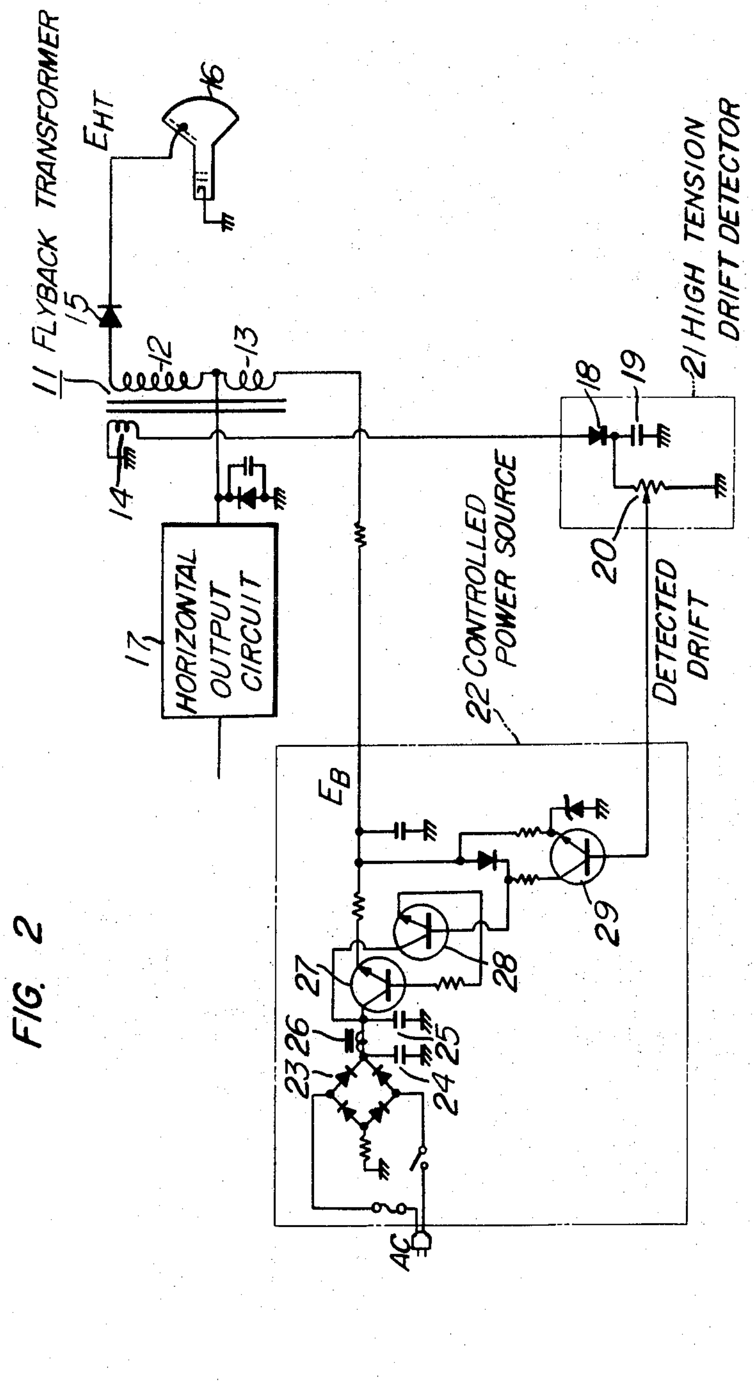
FIG. 2 is an electrical circuit diagram showing a practical structure of the embodiment shown in FIG. 1.

Referring to FIG. 2 showing a practical structure of the embodiment shown in FIG. 1, the flyback transformer 11 includes a high-tension coil 12, an output coil 13 and a detecting coil 14. The high-tension output $E_{HT}$ of the flyback transformer 11 is applied to the cathode-ray tube 16 through a diode 15. The horizontal output circuit 17 shown in block form in FIG. 2 has a structure conventionally employed in the art. The high-tension drift detector 21 is composed of a diode 18, a capacitor 19 and a resistor 20 and acts to rectify, smooth out and divide the voltage induced in the detecting coil 14, and such a voltage is applied to the controlled power source 22 as a detected drift signal. The controlled power source 22 includes a full-wave bridge rectifier 23, smoothing capacitors 24 and 25, a choke coil 26, and transistors 27, 28 and 29.

Suppose now that the high-tension output $E_{HT}$ of the flyback transformer 11 is reduced from $E_{HT1}$ to $E_{HT2}$ due to a variation in the high-tension load current. In this case, the tension induced in the detecting coil 14 is also reduced thereby reducing the internal impedance of the transistor 27 in the controlled power source 22. As a result, the input $E_B$ applied to the flyback transformer 11 is increased from $E_{B1}$ to $E_{B2}$ thereby increasing the high-tension output $E_{HT}$ of the flyback transformer 11 up to $E_{HT1}$ again, and the voltage induced in the detecting coil 14 is restored to the original value so that the controlled power source 22 is restored to its balanced state again.

Although the internal impedance of the transistor 27 in the controlled power source 22 is varied to control the voltage $E_B$ applied to the flyback transformer 11 in the embodiment above described, a thyristor may be incorporated in the controlled power source 22 for carrying out phase control thereby similarly stabilizing the high-tension output $E_{HT}$ of the flyback transformer 11.

Further, although the drift of the high-tension output $E_{HT}$ of the flyback transformer 11 is detected by the detecting coil 14 incorporated in the flyback transformer 11, the same effect can be attained by dividing the high-tension output $E_{HT}$ of the flyback transformer 11 and applying the divided voltage to the controlled power source 22 as the detected drift signal for similarly controlling the voltage $E_B$ applied to the flyback transformer 11.

Figure 3:
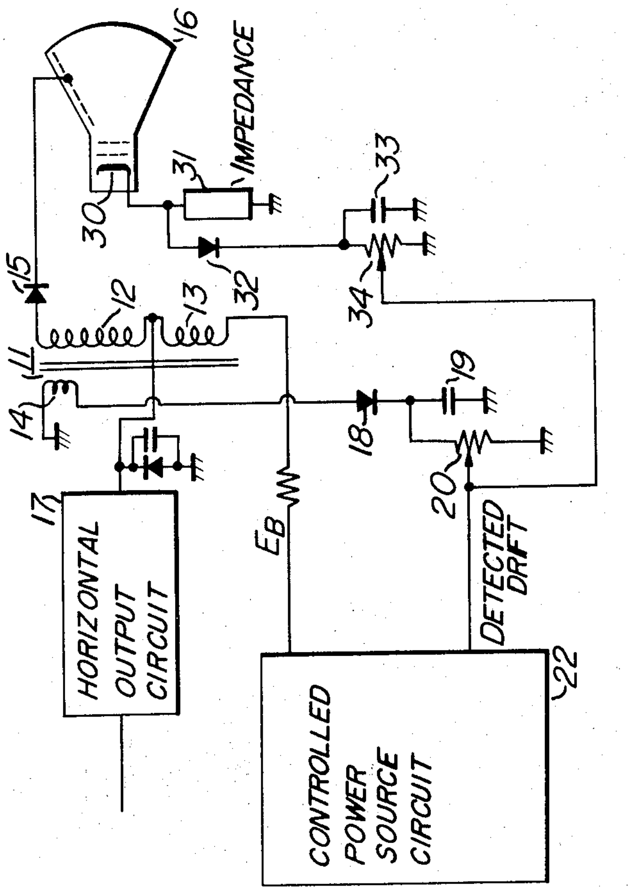
FIG. 3 is an electrical circuit diagram showing a partial modification in which an automatic brightness control is added to the arrangement shown in FIG. 2.

FIG. 3 shows a partial modification in which an automatic brightness control is added to the arrangement shown in FIG. 2. Referring to FIG. 3, the cathode 30 of the cathode-ray tube 16 is grounded through an impedance 31 and the voltage appearing across this impedance 31 is applied to the controlled power source 22 through a diode 32, a capacitor 33 and a resistor 34. Thus, even when the potential at the cathode 30 of the cathode-ray tube 16 is increased due to excessive flow of the electron beam in spite of the fact that the high-tension output $E_{HT}$ of the flyback transformer 11 is maintained at a predetermined value, the voltage $E_B$ applied to the flyback transformer 11 can be suitably reduced since the elements 32, 33 and 34 act as an automatic brightness control.

Figure 4:
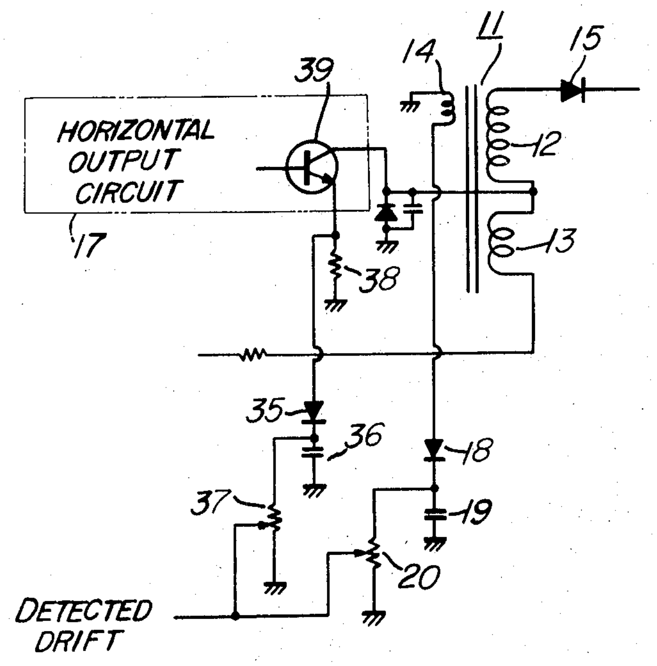
FIG. 4 is an electrical circuit diagram showing another partial modification in which another automatic brightness control is added to the arrangement shown in FIG. 2.

Another partial modification shown in FIG. 4 is also based on the same idea. Referring to FIG. 4, an automatic brightness control which is composed of a diode 35, a capacitor 36 and resistors 37 and 38 is connected to the horizontal output transistor 39 in the horizontal output circuit 17 for controlling the operation of the horizontal output transistor 39.

While the embodiment of the present invention shown in FIG. 1 is effective in stabilizing the high-tension output $E_{HT}$ of the flyback transformer 11, it may happen that the input $E_B$ applied to the flyback transformer 11 is increased due to an increase in the high-tension load current $I_{HT}$ and the voltage applied to the horizontal output transistor 39 in the horizontal output circuit 17 is increased resulting in an undesirable variation in the deflection sensitivity.

Figure 5:
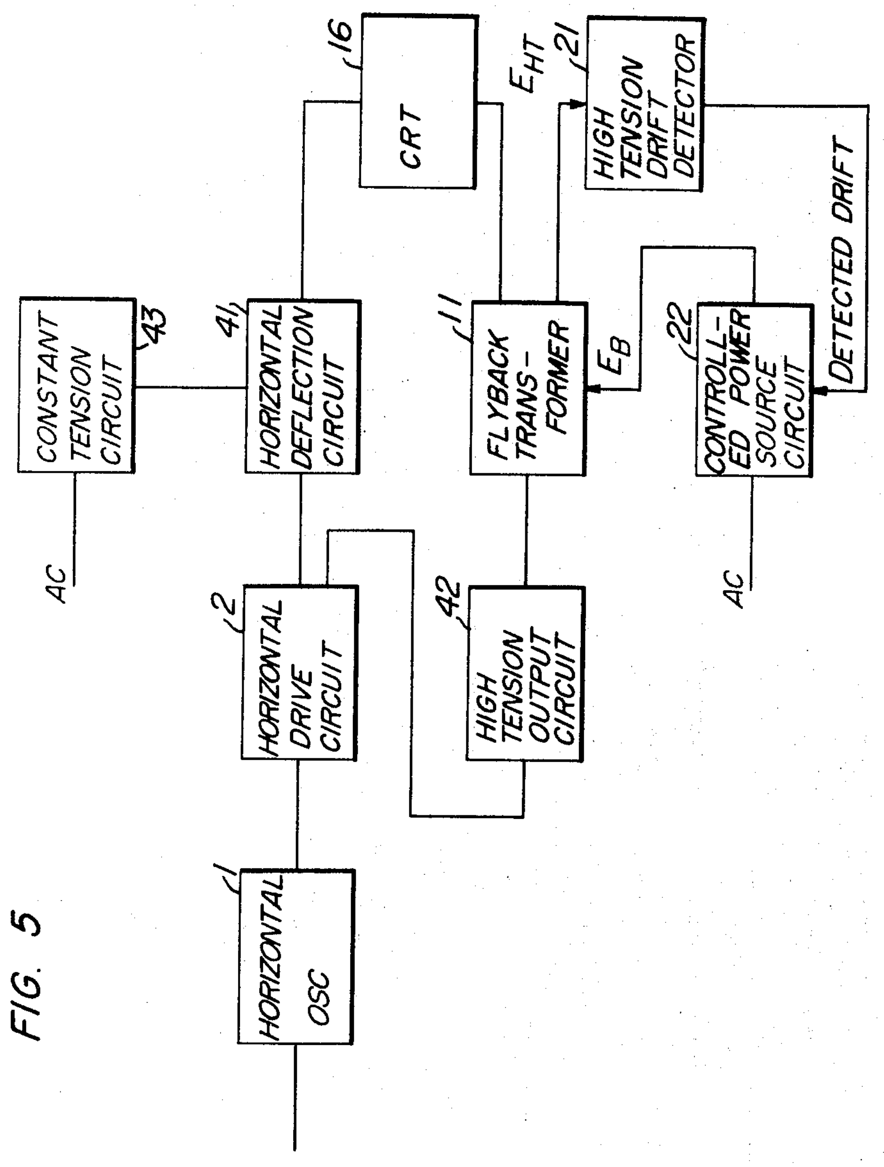
FIG. 5 is a block diagram of a modification of the embodiment of the present invention shown in FIG. 1.

Such a trouble can be eliminated by a modification shown in FIG. 5. Referring to FIG. 5, a horizontal deflection circuit 41 is connected to a constant tension circuit 43, and the flyback transformer 11 is connected to a high-tension output circuit 42. In this modification too, the input $E_B$ applied to the high-tension means including the flyback transformer 11 and the high-tension output circuit 42 is controlled in a manner similar to that described with reference to FIGS. 1 and 2 so as to stabilize the high-tension output $E_{HT}$ of the flyback transformer 11 and suppress undesirable variations in the deflection sensitivity to a minimum.

Further, the output coil 13 and the high-tension coil 12 in the flyback transformer 11 may be closely coupled so as to raise the order of the higher harmonics of ringing pulses for the flyback pulses. This arrangement is effective in that the high-tension output of the flyback transformer 11 and the collector voltage of the horizontal output transistor in the horizontal output circuit can be maintained constant in spite of any drift of the high-tension load current. Thus, the high-tension output of the flyback transformer 11 can be stabilized and undesirable variations in the deflection sensitivity can be suppressed to a minimum.

What is claimed is:

1. A television receiver comprising
a cathode ray tube,
a flyback transformer having an output coupled to said cathode ray tube, said flyback transformer providing a high-tension output voltage to said tube,
horizontal circuit means including a horizontal output circuit coupled to said flyback transformer,
a controlled power source including a power source transistor having emitter, base and collector electrodes, the emitter and collector electrodes of said transistor being connected in series with a DC voltage source and said flyback transformer, and
high-tension drift detecting means coupled between said flyback transformer and the base of said power source transistor, said drift detecting means detecting drift in the high-tension output voltage of said flyback transformer due to variations in the current delivered to said cathode ray tube and applying to the base of said transistor a detected feedback drift signal having a value dependent on said drift to control the voltage applied to said flyback transformer thereby stabilizing the high-tension DC output voltage of said transformer, said controlled power source being controlled by variations of the output voltage of said high-tension drift detecting means.

2. A television receiver as defined by claim 1 wherein said flyback transformer comprises series-connected high-tension and output coils and a detecting coil, said high-tension coil being coupled to said cathode ray tube, said output coil being coupled to the emitter-collector path of said power source transistor and said detecting coil being coupled to said high-tension drift detecting means.

3. A television receiver as defined by claim 2 wherein said drift detecting means comprises a diode connected in series with a parallel-connected resistor and capacitor, said diode being coupled to said detecting coil and said resistor being coupled to the base of said power source transistor.

4. A television receiver as defined by claim 1 wherein said horizontal circuit means further comprises a horizontal deflection circuit coupled between said constant tension circuit and said cathode ray tube, said circuit minimizing undesirable variations in deflection sensitivity.

5. A television receiver comprising
a cathode ray tube, a flyback transformer having an output coupled to said cathode ray tube, said flyback transformer providing a high-tension output voltage to said tube, horizontal circuit means including a horizontal output circuit coupled to said flyback transformer, a controlled power source including a semiconductor element having a control electrode, said semiconductor element being connected in series with a DC voltage source and said flyback transformer, and high-tension drift detecting means coupled between said flyback transformer and the control electrode of said semiconductor element, said drift detecting means detecting drift in the high-tension output voltage of said flyback transformer due to variations in the current delivered to said cathode ray tube and applying to said control electrode a detected drift signal having a value dependent on said drift to control the voltage applied to said flyback transformer thereby stabilizing the high-tension DC output voltage of said transformer.

6. A television receiver comprising a cathode ray tube, a flyback transformer having an output coupled to said cathode ray tube, said flyback transformer providing a high-tension output voltage to said tube, horizontal circuit means including a horizontal output circuit coupled to said flyback transformer, a controlled power source including a power source transistor having emitter, base and collector electrodes, the emitter and collector electrodes of said transistor being connected in series with a DC voltage source and said flyback transformer, high-tension drift detecting means coupled between said flyback transformer and the base of said power source transistor, said drift detecting means detecting drift in the high-tension output voltage of said flyback transformer due to variations in the current delivered to said cathode ray tube and applying to the base of said transistor a detected feedback drift signal having a value dependent on said drift to control the voltage applied to said flyback transformer thereby stabilizing the high-tension DC output voltage of said transformer, and automatic brightness control means coupled between the cathode of said cathode ray tube and the base of said power source transistor.

7. A television receiver as defined by claim 6 wherein said drift detecting means and said automatic brightness control means each comprises a diode connected in series with a parallel-connected resistor and capacitor, the diode in said drift detecting means being coupled to said flyback transformer and the diode in said automatic brightness control means being coupled to the cathode of said cathode ray tube, the resistors in said drift detecting means and automatic brightness control means being coupled to the base of said power source transistor.

8. A television receiver comprising a cathode ray tube, a flyback transformer having an output coupled to said cathode ray tube, said flyback transformer providing a high-tension output voltage to said tube, horizontal circuit means including a horizontal output circuit coupled to said flyback transformer, said horizontal output circuit including an output transistor having its collector coupled to said flyback transformer, a controlled power source including a power source transistor having emitter, base and collector electrodes, the emitter and collector electrodes of said transistor being connected in series with a DC voltage source and said flyback transformer, high-tension drift detecting means coupled between said flyback transformer and the base of said power source transistor, said drift detecting means detecting drift in the high-tension output voltage of said flyback transformer due to variations in the current delivered to said cathode ray tube and applying to the base of said transistor a detected feedback drift signal having a value dependent on said drift to control the voltage applied to said flyback transformer thereby stabilizing the high-tension DC output voltage of said transformer, and automatic brightness control means coupled between the emitter of said output transistor and the base of said power source transistor.

9. A television receiver as defined by claim 8 wherein said drift detecting means and said automatic brightness control means each comprises a diode connected in series with a parallel-connected resistor and capacitor, the diode in said drift detecting means being coupled to said flyback transformer and the diode in said automatic brightness control means being coupled to the emitter of said output transistor, the resistors in said drift detecting means and automatic brightness control means being coupled to the base of said power source transistor.

* * * * *